(12) United States Patent
Kitagawa et al.

(10) Patent No.: US 9,309,947 B2
(45) Date of Patent: Apr. 12, 2016

(54) METHOD OF MANUFACTURING CYLINDER APPARATUS

(71) Applicant: HITACHI AUTOMOTIVE SYSTEMS, LTD., Ibaraki (JP)

(72) Inventors: Yasuyuki Kitagawa, Kanagawa (JP); Naoya Kubo, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 277 days.

(21) Appl. No.: 13/622,619

(22) Filed: Sep. 19, 2012

(65) Prior Publication Data
US 2013/0074341 A1    Mar. 28, 2013

(30) Foreign Application Priority Data
Sep. 28, 2011    (JP) .................................. 2011-212733

(51) Int. Cl.
| B23P 17/00 | (2006.01) |
| F16F 9/348 | (2006.01) |
| B29C 45/14 | (2006.01) |

(52) U.S. Cl.
CPC ........... *F16F 9/3484* (2013.01); *B29C 45/1459* (2013.01); *B29C 45/1418* (2013.01); *B29C 2045/14459* (2013.01); *B29C 2045/14893* (2013.01); *Y10T 29/4998* (2015.01); *Y10T 29/49405* (2015.01)

(58) Field of Classification Search
CPC ............ B29C 45/1459; B29C 45/1418; B29C 45/14221; B29C 2045/14459; B29C 2045/14893; B28B 23/02; B28B 23/043; B28B 23/04; Y10T 29/49405; Y10T 29/4998

USPC .......... 264/261, 262, 265; 425/111, 117, 383, 425/385, 555; 29/527.1
See application file for complete search history.

(56) References Cited

U.S. PATENT DOCUMENTS 3,698,702 A  *  10/1972  Beck ............................... 267/47
3,815,201 A  *  6/1974  Conrad ....................... 29/893.37
(Continued)

FOREIGN PATENT DOCUMENTS

| JP | 11173377 A | * | 6/1999 | .............. F16F 15/04 |
| JP | 2002-295556 |   | 10/2002 | |
| JP | 2006-38097 |   | 2/2006 | |

OTHER PUBLICATIONS

English machine translation of JP 2002295556 A published Oct. 9, 2002.*

(Continued)

*Primary Examiner* — Essama Omgba
(74) *Attorney, Agent, or Firm* — Wenderoth, Lind & Ponack, L.L.P.

(57) ABSTRACT

When manufacturing a disk valve having a ring-shaped elastic seal member fixed to one side thereof for use in a cylinder type hydraulic shock absorber, a disk valve blanked from a plate material is set on a bottom of a lower mold member that is curved to be convex on one side. Mold clamping is performed to form a cavity by a cylindrical mold part and to press the disk valve with a press part to deform the disk valve into a shape that is convex on one side. In this state, the cavity is filled with a rubber material through a passage and vulcanized and cured to mold and fix an elastic seal member to the disk valve. At this time, the disk valve is deformed in a direction in which the curvature reduces by shrinkage of the rubber material.

15 Claims, 2 Drawing Sheets

(56) References Cited

U.S. PATENT DOCUMENTS

| | | | | |
|---|---|---|---|---|
| 3,876,734 | A * | 4/1975 | Howden | 264/2.4 |
| 3,922,327 | A * | 11/1975 | Howden | 264/2.4 |
| 4,627,809 | A * | 12/1986 | Okabayashi et al. | 425/555 |
| 4,953,671 | A * | 9/1990 | Imaizumi | 188/282.3 |
| 5,018,608 | A * | 5/1991 | Imaizumi | 188/322.15 |
| 5,072,812 | A * | 12/1991 | Imaizumi | 188/282.5 |
| 5,293,971 | A * | 3/1994 | Kanari et al. | 188/282.1 |
| 5,316,113 | A * | 5/1994 | Yamaoka | 188/282.6 |
| 5,404,973 | A * | 4/1995 | Katoh et al. | 188/282.1 |
| 5,761,788 | A * | 6/1998 | Hirota et al. | 29/527.1 |
| 6,435,487 | B1 * | 8/2002 | Takaoka et al. | 267/140.13 |
| 6,461,455 | B1 * | 10/2002 | Meatto et al. | 156/64 |
| 6,474,454 | B2 * | 11/2002 | Matsumoto et al. | 188/282.6 |
| 6,540,215 | B2 * | 4/2003 | Takaoka et al. | 267/140.13 |
| 6,660,114 | B2 * | 12/2003 | Meatto et al. | 156/64 |
| 7,065,852 | B2 * | 6/2006 | Sudo et al. | 29/434 |
| 7,322,449 | B2 * | 1/2008 | Yamaguchi | 188/282.3 |
| 7,458,448 | B2 * | 12/2008 | Katou et al. | 188/282.6 |
| 7,694,785 | B2 * | 4/2010 | Nakadate | 188/266.5 |
| 8,322,369 | B2 * | 12/2012 | Schmidt et al. | 137/614.2 |
| 8,322,499 | B2 * | 12/2012 | Schmidt et al. | 188/322.13 |
| 8,794,403 | B2 * | 8/2014 | Chikamatsu | 188/282.6 |
| 2002/0036370 | A1 * | 3/2002 | Takaoka et al. | 267/140.11 |
| 2005/0263363 | A1 * | 12/2005 | Katou et al. | 188/322.22 |
| 2005/0279597 | A1 * | 12/2005 | Yamaguchi | 188/322.13 |

OTHER PUBLICATIONS

Office Action issued Apr. 30, 2015 in corresponding Japanese patent application No. 2011-212733.

* cited by examiner

METHOD OF MANUFACTURING CYLINDER APPARATUS

BACKGROUND OF THE INVENTION

The present invention relates to a method of manufacturing cylinder apparatus such as hydraulic shock absorbers.

Examples of cylinder apparatus include a cylinder type hydraulic shock absorber that is attached to a suspension system of a vehicle, e.g. an automobile. Such a shock absorber generally has the following structure. A piston connected with a piston rod is slidably fitted in a cylinder having a fluid sealed therein. In response to a stroke of the piston rod, the piston slidingly moves in the cylinder, causing a flow of fluid. The flow of fluid is controlled to generate damping force by a damping force adjusting mechanism comprising an orifice, a disk valve, etc.

In a hydraulic shock absorber disclosed in Japanese Patent Application Publication No. 2006-38097, a back-pressure chamber (pilot chamber) is formed at the back of a disk valve constituting a damping force generating mechanism. A part of the flow of fluid is introduced into the back-pressure chamber to apply the pressure in the back-pressure chamber to the disk valve in the direction for closing the valve. The pressure in the back-pressure chamber is controlled with a pilot valve to control the valve-opening operation of the disk valve. With this arrangement, it is possible to increase the degree of freedom for adjusting damping force characteristics.

In the shock absorber disclosed in Japanese Patent Application Publication No. 2006-38097, a ring-shaped seal member made of an elastic material, e.g. rubber, is fixed to the outer periphery of the rear side of the disk valve by vulcanization bonding or the like, and the seal member is slidably and fluid-tightly fitted to a cylindrical portion of a cylindrical member, one end of which is closed, and which is disposed at the back of the disk valve, thereby forming a back-pressure chamber.

The present inventors measured the damping force characteristics of shock absorbers using a disk valve having a ring-shaped seal member fixed to one side thereof as stated above, and found that the damping force characteristics vary for each shock absorber. The inventors investigated the cause of variations in damping force characteristics, and found that there are variations in flatness of the disk valve of each shock absorber.

SUMMARY OF THE INVENTION

An object of the present invention is to provide a cylinder apparatus made capable of obtaining stable damping force characteristics by reducing variations in flatness of a disk valve having a seal member fixed thereto.

To solve the above-described problems, the present invention provides a method of manufacturing a cylinder apparatus including a cylinder having a fluid sealed therein, a piston slidably fitted in the cylinder, a piston rod connected to the piston, and a valve device controlling or regulating a flow of fluid caused by sliding movement of the piston, thereby generating a pressure difference. The valve device includes an annular disk valve having an annular elastic seal member fixed to at least one side thereof. The method comprises the step of fixing the elastic seal member to the disk valve. The step includes a deforming step of deforming the disk valve into a shape that is convex on one side, and a fixing step of fixing the elastic seal member to the disk valve deformed in the deforming step.

DESCRIPTION OF THE EMBODIMENTS

The following embodiments solve not only the above-described technical problems but also various other problems and exhibit various advantageous effects of the present invention. Principal problems that the following embodiments solve, including those stated above, will be listed below.
[Characteristics Improvement]

Figure 3:
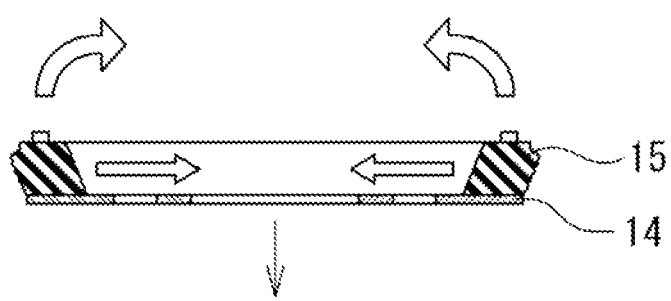
FIG. 3 is a vertical sectional view of the disk valve having the seal member fixed thereto.

The present inventors found that, when, as shown in FIG. 3, a ring-shaped elastic seal member 15 made of rubber is vulcanization-bonded to a disk valve 14, the disk valve 14 is slightly deformed by shrinkage of the rubber so that the side thereof remote from the elastic seal member 15 is convex (it should be noted that, the term "convex" as used in the specification of this application means that the inner peripheral side of the disk valve 14 projects more than the outer peripheral side thereof).

We also found that, when an elastic seal member 15 is to be vulcanization-bonded to a disk valve 14 deformed to be convex on one side, if the seal member 15 is vulcanization-bonded to a surface of the disk valve 14 on the convex side, the deformation of the disk valve 14 is reduced by shrinkage of the elastic seal member 15. In this regard, if the elastic seal member 15 is vulcanization-bonded to a surface of the disk valve 14 on the concave side (i.e. the side opposite to the convex side), the deformation of the elastic seal member 15 is increased by shrinkage of the elastic seal member 15. If the disk valve 14 having the elastic seal member 15 vulcanization-bonded to the surface on the concave side (i.e. the side opposite to the convex side) is used by being disposed as shown in FIG. 1, the load with which the disk valve 14 is abutted against a seat portion 12 is undesirably small, so that it may be impossible to obtain desired damping force characteristics.
[Productivity Improvement]

In general, the disk valve 14 is formed by blanking a metallic plate material. In this regard, the disk valve 14 is slightly deformed to be convex on one side, depending on the direction in which blanking is performed. Variations in flatness of the disk valve 14 may be eliminated to a certain extent by controlling the production process such that the elastic seal member 15 is always vulcanization-bonded to the surface of the disk valve 14 on the convex side. It is, however, very difficult to determine at a glance which side of the disk valve 14 is the convex side because the disk valve 14 is subjected to grinding and other process after it has been formed by blanking. The disk valve 14 may be formed by wire cutting a metallic plate material so that the disk valve 14 is not convex on either side thereof. This method, however, is unfavorably low in productivity and unsuitable for mass-production. Further, even if the disk valve 14 is formed by wire cutting, when an elastic seal member 15 is vulcanization-bonded to the disk valve 14, there may be variations in flatness, depending on conditions. Therefore, this method cannot solve the problem.

Embodiments of the present invention will be explained below with reference to the accompanying drawings.

Figure 1:
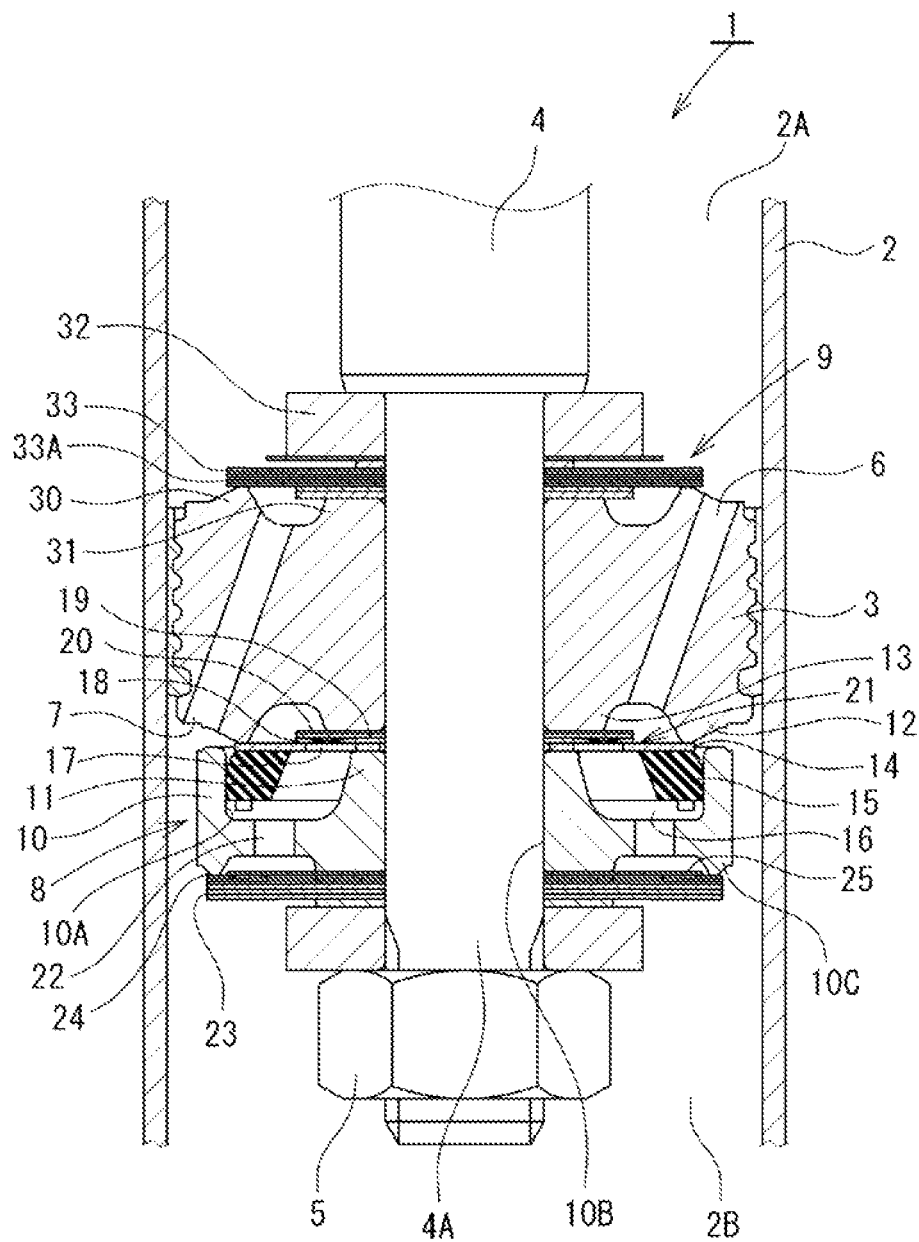
FIG. 1 is a fragmentary vertical sectional view of a main part of a shock absorber according to an embodiment of the present invention.

As shown in FIG. 1, a shock absorber 1 as a cylinder apparatus according to an embodiment of the present invention is a cylinder type hydraulic shock absorber attached to a suspension system of a vehicle, e.g. an automobile.

A cylinder 2 (only a part of a side wall thereof is shown in the figure) has a hydraulic oil sealed therein as a hydraulic fluid. A piston 3 is slidably fitted in the cylinder 2. The piston 3 divides the interior of the cylinder 2 into two chambers, i.e. a cylinder upper chamber 2A and a cylinder lower chamber 2B. A shaft portion 4A at one end of a piston rod 4 is connected to the piston 3 with a nut 5. The other end of the piston rod 4 extends through a rod guide (not shown) and an oil seal (not shown), which are provided in the upper end of the cylinder 2, and extends to the outside of the cylinder 2. The cylinder lower chamber 2B is connected to a reservoir (not shown) through a base valve (not shown) having a proper flow resistance. The reservoir has a hydraulic oil and a gas sealed therein.

The piston 3 is provided with an extension passage 6 and a compression passage 7 for communication between the cylinder upper and lower chambers 2A and 2B. An extension damping force generating mechanism 8 is provided at an end of the piston 3 closer to the cylinder lower chamber 2B. The extension damping force generating mechanism 8 generates a damping force by controlling the flow of hydraulic oil through the extension passage 6. A compression damping force generating mechanism 9 is provided at an end of the piston 3 closer to the cylinder upper chamber 2A. The compression damping force generating mechanism 9 generates a damping force by controlling the flow of hydraulic oil through the compression passage 7.

The extension damping force generating mechanism 8 will be explained below.

A valve member 10 is installed at the end of the piston 3 closer to the cylinder lower chamber 2B. The valve member 10 is in the shape of a cylinder, one end of which is closed. The valve member 10 has a cylindrical retaining portion 11 stood in the inner center of the bottom thereof. The shaft portion 4A extends through the cylindrical retaining portion 11. The shaft portion 4A is formed at the proximal end of the piston rod 4. The shaft portion 4A has a circular outer periphery and is smaller in diameter than the rest of the piston rod 4. The nut 5 is screwed onto a thread-grooved end of the shaft portion 4A extending through the retaining portion 11, thereby the valve member 10 being secured to the piston 3. The piston 3 has an annular seat portion 12 projecting from the outer periphery of an end surface thereof closer to the cylinder lower chamber 2B. The piston 3 further has an annular clamp portion 13 projecting from the end surface thereof at the inner peripheral side of the seat portion 12. An annular space is defined or formed between the seat portion 12 and the clamp portion 13. The extension passage 6 opens into the annular space. A flexible annular disk valve 14 is clamped at an inner peripheral portion thereof between the retaining portion 11 and the clamp portion 13. An outer peripheral portion of the disk valve 14 seats on the seat portion 12. An annular elastic seal member 15 is integrally provided on an outer peripheral portion of the rear side of the disk valve 14. The outer peripheral portion of the elastic seal member 15 slidably and fluid-tightly abuts against an inner peripheral surface 10A of a cylindrical portion of the valve member 10, thereby forming a back-pressure chamber 16 inside the valve member 10.

The disk valve 14 has openings 17 provided in the inner peripheral portion thereof. A cut disk member 19 and a disk member 20 are stacked on the disk valve 14. The cut disk member 19 has a plurality of cut portions 18 (orifices) at positions facing the openings 17. The openings 17 and the cut portions 18 form a back-pressure chamber entrance passage 21 constantly communicating between the extension passage 6 and the back-pressure chamber 16. When the disk valve 14 deflects to lift from the seat portion 12, the disk valve 14 also lifts from the cut disk member 19 simultaneously. Consequently, the flow path area of the back-pressure chamber entrance passage 21 increases. The cut disk member 19 and the disk member 20 are secured by being axially clamped between the clamp portion 13 of the piston 3 and the distal end of the retaining portion 11 of the valve member 10, together with the disk valve 14.

The elastic seal member 15 is made of an elastic material, e.g. rubber, and fixed to the disk valve 14 by vulcanization bonding or the like. The outer peripheral portion of the elastic seal member 15 is tapered so that the diameter thereof increases with the distance from the disk valve 14, to which the seal member 15 is fixed. An outer peripheral portion of the elastic seal member 15, which is in sliding contact with the inner peripheral surface 10A of the cylindrical portion of the valve member 10, is formed with a plurality of concentrically disposed steps to seal the area of sliding contact between the elastic seal member 15 and the inner peripheral surface 10A in a multi-step sealing manner. The disk valve 14 is secured with the inner peripheral portion thereof axially clamped by tightening the nut 5.

The bottom portion of the valve member 10 is provided with a passage 22 for communication between the back-pressure chamber 16 and the cylinder lower chamber 2B. The passage 22 is provided with a normally-closed relief valve 23 that relieves the hydraulic oil in the back-pressure chamber 16 into the cylinder lower chamber 2B when the pressure in the back-pressure chamber 16 reaches a predetermined pressure. The relief valve 23 comprises a plurality of disk valves. The relief valve 23 is provided with a downstream orifice 24 (cut portion) constantly communicating between the back-pressure chamber 16 and the cylinder lower chamber 2B. The relief valve 23 is further provided with a check valve 25 allowing only the flow of hydraulic oil from the cylinder lower chamber 2B toward the back-pressure chamber 16. The downstream orifice 24 can be formed by providing a cut portion in a disk valve abutting against a seat portion 10C of the valve member 10 of the relief valve 23, or by coining the seat portion 10C.

Next, the compression damping force generating mechanism 9 will be explained.

The piston 3 has a seat portion 30 and a clamp portion 31, which annularly project from an end surface of the piston 3 closer to the cylinder upper chamber 2A. The seat portion 30 is located at a position closer to the outer periphery of the piston 3. The clamp portion 31 is located at a position closer to the inner periphery of the piston 3. An annular space is formed between the seat portion 30 and the clamp portion 31. The compression passage 7 opens into the annular space. A disk valve 33 is axially clamped at an inner peripheral portion thereof between the clamp portion 31 and a stepped portion of the piston rod 4 formed at the proximal end of the shaft portion 4A, with an annular retainer 32 interposed between the disk valve 33 and the stepped portion of the piston rod 4. An outer peripheral portion of the disk valve 33 seats on the seat portion 30. The disk valve 33 comprises a plurality of stacked disks. The disk valve 33 deflects to lift from the seat portion 30 to open upon receiving the pressure in the cylinder lower chamber 2B through the compression passage 7 and thus adjusts the flow path area of the compression passage 7 according to the degree of opening thereof. The disk valve 33 is provided with an orifice 33A (cut portion) constantly communicating between the cylinder upper and lower chambers 2A and 2B. The orifice 33A may, for example, be a cut portion formed in the disk valve 33 or a flow passage formed by coining the seat portion 30.

The following is an explanation of the operation of the shock absorber 1 arranged as stated above.

During the extension stroke of the piston rod 4, the sliding movement of the piston 3 in the cylinder 2 causes the hydraulic oil in the cylinder upper chamber 2A to flow toward the cylinder lower chamber 2B through the extension passage 6 in the piston 3. Thus, damping force is generated by the extension damping force generating mechanism 8. At this time, an amount of hydraulic oil corresponding to the amount by which the piston rod 4 withdraws from the cylinder 2 flows into the cylinder lower chamber 2B from the reservoir through the base valve, and the gas in the reservoir expands correspondingly, thereby compensating for a volumetric change of the hydraulic oil in the cylinder 2.

The extension damping force generating mechanism 8 operates as follows. When the piston speed is in a very low speed region (i.e. in the initial stroke region of the piston rod 4), damping force of orifice characteristics is generated by the back-pressure chamber entrance passage 21 and the downstream orifice 24. As the piston speed increases, the disk valve 14 opens to generate damping force of valve characteristics. As the disk valve 14 opens, the flow path area of the back-pressure chamber entrance passage 21 increases, and the pressure in the back-pressure chamber 16 increases. Accordingly, as the piston speed increases, the valve-opening pressure of the disk valve 14 increases, and damping force increases. When the pressure in the back-pressure chamber 16 reaches a predetermined pressure, the relief valve 23 opens to relieve the pressure in the back-pressure chamber 16 into the cylinder lower chamber 2B, thereby preventing an excessive rise in the valve-opening pressure of the disk valve 14, i.e. preventing the extension damping force from increasing excessively.

During the compression stroke of the piston rod 4, the sliding movement of the piston 3 in the cylinder 2 causes the hydraulic oil in the cylinder lower chamber 2B to flow into the cylinder upper chamber 2A through the compression passage 7 in the piston 3. Thus, damping force is generated by the compression damping force generating mechanism 9. At this time, an amount of hydraulic oil corresponding to the amount by which the piston rod 4 enters the cylinder 2 flows into the reservoir through the base valve and compresses the gas in the reservoir, thereby compensating for a volumetric change of the hydraulic oil in the cylinder 2.

The compression damping force generating mechanism 9 operates as follows. When the piston speed is in a low speed region (i.e. before the disk valve 33 opens), damping force of orifice characteristics is generated by the orifice 33A. When the piston speed increases and eventually the valve-opening pressure of the disk valve 33 is reached, the disk valve 33 opens to generate damping force of valve characteristics according to the degree of opening of the disk valve 33.

During the compression stroke of the piston rod 4, the check valve 25 in the extension damping force generating mechanism 8 opens to introduce the pressure in the cylinder lower chamber 2B into the back-pressure chamber 16. Consequently, the force of pressure in the back-pressure chamber 16 that acts in the direction for closing the disk valve 14 becomes larger than the force of pressure in the cylinder lower chamber 2B that acts in the direction for opening the disk valve 14. Thus, the extension disk valve 14 can be surely maintained in its closed position, and stable damping force can be obtained.

Next, a method of manufacturing the disk valve 14 of the shock absorber 1, which has the elastic seal member 15 fixed thereto, will be explained with reference to FIGS. 2 and 3.

Figure 2:
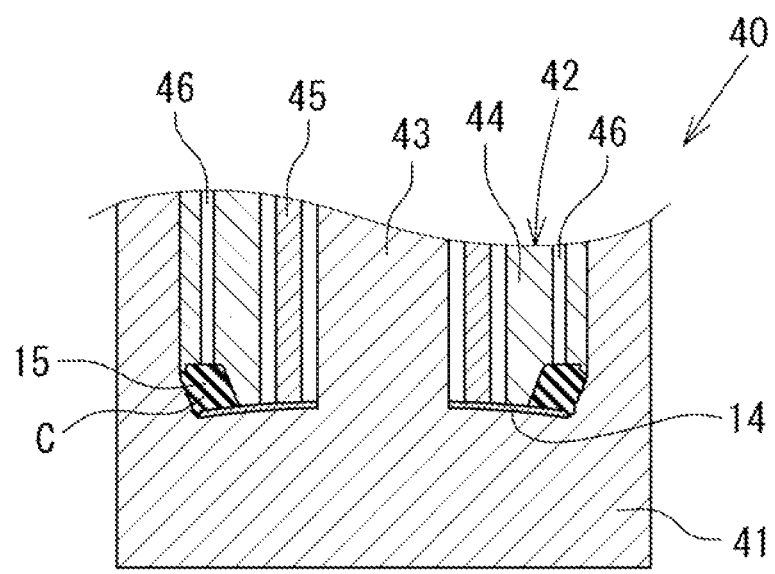
FIG. 2 is a vertical sectional view schematically showing the structure of a mold for vulcanization-bonding a seal member to a disk valve of the shock absorber shown in FIG. 1.

FIG. 2 shows a mold 40 for vulcanization-bonding the rubber elastic seal member 15 to the disk valve 14. As shown in FIG. 2, the mold 40 has a lower mold member 41 and an upper mold member 42. The lower mold member 41 is shaped in a substantially circular cylinder, one end of which is closed, to insert the disk valve 14 thereinto and to form a bottom and outer periphery of a cavity C for molding an elastic seal member. The lower mold member 41 has a core 43 stood in the center of the bottom of the lower mold member 41 to position the disk valve 14. It should be noted that the core 43 may be omitted because it is also possible to position the disk valve 14 in the diametrical direction by the outer periphery of the lower mold member 41. It is, however, preferable to use the core 43 because a rubber material can also be molded around the outer periphery of the disk valve 14 by the presence of the core 43. The bottom of the lower mold member 41 is curved at a predetermined curvature or sloped at a predetermined angle so that the center of the bottom projects convexly. The core 43, which stands in the center of the bottom of the lower mold member 41, is inserted through the opening of the disk valve 14 to position the disk valve 14 concentrically with respect to the cavity C. The bottom of the lower mold member 41 is slightly larger in diameter than the disk valve 14. With this structure, the elastic seal member 15 is formed in the cavity C so as to cover the outer periphery of the disk valve 14, and is also bonded to the outer periphery of the disk valve 14.

The upper mold member 42 has a cylindrical mold part 44 fittable into the cylindrical portion of the lower mold member 41, and a cylindrical press part 45 inserted between the cylindrical mold part 44 and the core 43 of the lower mold member 41 to abut against the disk valve 14 set in the lower mold member 41. The cylindrical mold part 44 abuts at the distal end thereof against the disk valve 14 set in the lower mold member 41, thereby forming the cavity C to mold a tapered inner periphery and flat distal end of the elastic seal member 15. The upper mold member 42 is provided with a passage 46 for filling the cavity C with a rubber material to form the elastic seal member 15. The cylindrical mold part 44 and the press part 45 have respective distal ends that abut against the disk valve 14. The distal ends of the parts 44 and 45 are curved or sloped in conformity to the curvature or angle of the bottom of the lower mold member 41.

The following is an explanation of the process of manufacturing the disk valve 14 having the elastic seal member 15 fixed thereto by using the mold 40.

A metallic plate material is blanked and subjected to necessary processing such as grinding to make a disk valve 14. At this time, the disk valve 14 is slightly curved to be convex on one side by deformation during blanking. The disk valve 14 is set in the lower mold member 41, with the core 43 inserted through the opening the disk valve 14. At this time, the convex side of the disk valve 14 may face either the lower mold member 41 or the upper mold member 42. It should be noted that the method of making the disk valve 14 is not limited to blanking. The disk valve 14 may be made by wire cutting.

The cylindrical mold part 44 of the upper mold member 42 is fitted into the cylindrical portion of the lower mold member 41, and the cylindrical mold part 44 and the press part 45 are abutted against the disk valve 14 set in the lower mold member 41. Then, mold clamping is performed to form a cavity C and to press the disk valve 14 against the bottom of the lower mold member 41 to deform the disk valve 14 into a shape that is convex on one side. In this state, a rubber material is filled into the cavity C through the passage 46. The rubber material is vulcanized and cured in the cavity C to mold and bond an elastic seal member 15 to the disk valve 14.

After the rubber material in the cavity C has been cured, the mold 40 is opened to remove the disk valve 14 having the elastic seal member 15 fixed thereto. At this time, as shown in FIG. 3, the disk valve 14 is subjected to force that urges the disk valve 14 to be deformed to be convex on the side thereof opposite to the side to which the elastic seal member 15 is fixed, due to the shrinkage of the rubber material constituting the elastic seal member 15. However, the disk valve 14 has been deformed to be convex on the side thereof to which the elastic seal member 15 is to be fixed, by being pressed against the curved or sloped bottom of the lower mold member 41. Therefore, these deformations are canceled by each other, thereby allowing the disk valve 14 to become substantially flat. Consequently, it is possible to reduce the variations in flatness of the disk valve 14 and hence possible to obtain stable damping force characteristics. The disk valve 14 is deformed by the lower mold member 41 so as to be convex on the side thereof to which the elastic seal member 15 is to be fixed, irrespective of whether the convex side of the disk valve 14 faces upward or downward when the disk valve 14 is set in the lower mold member 41. Therefore, it is unnecessary to control the direction of the convex side of the disk valve 14 when set in the lower mold member 41, and the manufacturing process will not become complicated. Accordingly, productivity can be increased to a considerable extent.

It should be noted that correcting force with which the disk valve 14 is pressed against the bottom of the lower mold member 41 to deform the disk valve 14 into a convex shape is such a level that the disk valve 14 formed by the manufacturing method of the present invention is deformed to be convex on one side when the elastic seal member 15 is removed therefrom after the disk valve 14 has been applied to a cylinder apparatus and disassembled afterward.

In the above-described embodiment, the bottom of the lower mold member 41 may be formed into a concave shape to deform the disk valve 14 to be convex on the side thereof opposite to the side to which the elastic seal member 15 is to be fixed. In this case, the curve of the disk valve 14 is increased by the shrinkage of the rubber material constituting the elastic seal member 15. However, variations in shape of the disk valve 14 are reduced, and consequently, stable damping force characteristics can be obtained. It should be noted, however, that it is preferable to fix the seal member 15 to the convex side of the disk valve 14 because it is possible with this structure to increase the load with which the disk valve 14 is abutted against the seat portion 12 and hence possible to reduce leakage. The elastic seal member 15 may be not only fixed to one side of the disk valve 14 and but also partly fixed to the other side of the disk valve 14. The elastic seal member 15 may be formed by using other seal material such as engineering plastics in addition to rubber material.

Although in the foregoing embodiment only the extension damping force generating mechanism 8 is a back-pressure type (pilot-type) damping force generating mechanism having the back-pressure chamber 16, the compression damping force generating mechanism 9 may also be a back-pressure type (pilot-type) damping force generating mechanism having a back-pressure chamber similar to that of the extension damping force generating mechanism 8. The damping force generating mechanism may be disposed at the side of the cylinder although it is provided in the piston part in the foregoing embodiment. Although in the foregoing embodiment the present invention has been explained with regard to a shock absorber using a hydraulic oil as a hydraulic fluid as one example of cylinder apparatus, the present invention is not limited thereto but may be similarly applied to other cylinder apparatus having a disk valve with an elastic seal member fixed thereto, e.g. a gas spring, a lock apparatus, a hydraulic cylinder for suspension, etc.

The cylinder apparatus manufactured by the method of the foregoing embodiment can obtain stable damping force characteristics through the reduction of variations in flatness of a disk valve having a seal member fixed thereto.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2011-212733 filed on Sep. 28, 2011.

The entire disclosure of Japanese Patent Application No. 2011-212733 filed on Sep. 28, 2011 including specification, claims, drawings and summary is incorporated herein by reference in its entirety.

What is claimed is:

1. A method of manufacturing a cylinder apparatus, the cylinder apparatus including:
    a cylinder having a fluid sealed therein;
    a piston slidably fitted in the cylinder;
    a piston rod connected to the piston; and
    a valve device adapted to regulate a flow of fluid caused by sliding movement of the piston to generate a pressure difference;
    wherein the valve device includes an annular disk valve having an annular elastic seal member fixed to at least one side thereof;
    the method comprising:
    the step of fixing the elastic seal member to the disk valve, the step including:
    a deforming step of deforming the disk valve in such a manner that a surface on one side is convex and a surface on an opposite side is concave; and
    a fixing step of fixing the elastic seal member to the surface on the convex side of the disk valve deformed in the deforming step,
    wherein a correcting force with which the one side surface of the disk valve is deformed into a convex shape is at such a level that the disk valve is deformed to be convex on the one side when the elastic seal member is removed therefrom, and
    wherein the elastic seal member is shrunk after being fixed to apply a force for deforming the surface of the disk valve on the concave side to deflect the disk valve, thereby making the surfaces of the disk valve on the convex side and the concave side substantially flat.

2. The method of claim 1, wherein the elastic seal member is formed of a rubber material having fluid-tight properties and slidability.

3. The method of claim 1, wherein the deforming step includes a step of pressing the disk valve against a concave or convex mold.

4. The method of claim 3, wherein the mold is a mold for molding the elastic seal member.

5. The method of claim 1, wherein an inner peripheral portion of the disk valve is clamped, and the surface on the concave side of an outer peripheral portion of the disk valve seats on a seat portion of the piston and opens from the seat portion;

the elastic seal member is slidably fitted into a valve member disposed at a back of the disk valve to form a back-pressure chamber in the valve member, wherein a pressure in the back-pressure chamber acts on the disk valve in a direction for closing the disk valve.

6. The method of claim 5, wherein the elastic seal member includes an outer peripheral portion tapered so that a diameter thereof increases with a distance from the disk valve.

7. A method of manufacturing a shock absorber, the shock absorber comprising:
a cylinder having a fluid sealed therein;
a piston slidably fitted in the cylinder;
a piston rod connected to the piston; and
a damping valve device adapted to control a flow of fluid caused by sliding movement of the piston, the damping valve device including an annular disk valve having an annular elastic seal member of rubber material fixed to one side thereof;
the method comprising:
fixing the elastic seal member to the disk valve, including:
a deforming step of deforming the disk valve in such a manner that a surface on one side is convex and a surface on an opposite side is concave; and
a fixing step of fixing the elastic seal member to the convex side of the disk valve deformed in the deforming step by vulcanization and curing,
wherein an elastic seal member is not provided on the concave side of the disk valve,
wherein a correcting force with which the one side surface of the disk valve is deformed into a convex shape is at such a level that the disk valve is deformed to be convex on the one side thereof when the elastic seal member is removed therefrom, and
wherein the disk valve is deformable according to shrinkage of the elastic seal member at the time of the curing after vulcanization.

8. The method of claim 7, further comprising the steps of:
providing a first mold member and a second mold member;
the first mold member being shaped in a cylinder, one end of which is closed, to form a bottom and outer periphery of a cavity, the bottom of the first mold member being curved at a predetermined curvature or sloped at a predetermined angle so that a center of the bottom projects convexly;
the second mold member having a mold part fittable into the first mold member, the mold part adapted to abut at a distal end thereof against the disk valve set in the first mold member to form the cavity when the first mold member and the second mold member are closed,
the second mold member being provided with a passage for filling the cavity with a rubber material to form an elastic seal member, the distal end of the mold part, which abuts against the disk valve, being curved or sloped in conformity to the curvature or angle of the bottom of the first mold member;
the method further comprising the steps of:
setting a disk valve blanked from a plate material on the bottom of the first mold member;
closing the first mold member and the second mold member to form the cavity by the mold part and to press and deform the disk valve into a shape that is convex on one side;
filling a rubber material into the cavity through the passage and vulcanizing and curing the rubber material to mold and fix an elastic seal member to the disk valve; and
opening the first mold member and the second mold member after the rubber material in the cavity has been cured, and removing the disk valve having the elastic seal member fixed thereto.

9. The method of claim 8, wherein the bottom of the first mold member is slightly larger in diameter than the disk valve.

10. The method of claim 9, wherein the first mold member has a core stood in a center of the bottom thereof to position the disk valve, whereby the first mold member is provided with a cylindrical portion;
the mold part of the second mold member is a cylindrical mold part fittable into the cylindrical portion of the first mold member.

11. The method of claim 10, wherein, when the first mold member and the second mold member are closed, the core of the first mold member is inserted through an opening of the disk valve to position the disk valve concentrically with respect to the cavity.

12. The method of claim 11, wherein the second mold member has a cylindrical press part inserted between the cylindrical mold part and the core of the first mold member to abut against the disk valve set in the first mold member.

13. The method of claim 12, wherein the press part has a distal end abuttable against the disk valve, the distal end being curved or sloped in conformity to the curvature or angle of the bottom of the first mold member.

14. The method of claim 7, wherein the surfaces of the disk valve on the convex side and the concave side are made substantially flat by shrinkage of the elastic seal member.

15. The method of claim 7, wherein an inner peripheral portion of the disk valve is clamped, and the surface on the concave side of an outer peripheral portion of the disk valve seats on a seat portion of the piston and opens from the seat portion;
the elastic seal member is slidably fitted into a valve member disposed at a back of the disk valve to form a back-pressure chamber in the valve member,
wherein a pressure in the back-pressure chamber acts on the disk valve in a direction for closing the disk valve.

* * * * *